(12) United States Patent
Verna

(10) Patent No.: US 11,412,711 B2
(45) Date of Patent: Aug. 16, 2022

(54) PET LEASH HAVING A LOOP HANDLE AND SLIDING CINCH MEMBER TO ADJUST LOOP SIZE OF LOOP HANDLE

(71) Applicant: Donna Jean Verna, Coconut Creek, FL (US)

(72) Inventor: Donna Jean Verna, Coconut Creek, FL (US)

( * ) Notice: Subject to any disclaimer, the term of this patent is extended or adjusted under 35 U.S.C. 154(b) by 164 days.

(21) Appl. No.: 16/280,733

(22) Filed: Feb. 20, 2019

(65) Prior Publication Data
US 2020/0260690 A1 Aug. 20, 2020

(51) Int. Cl.
*A01K 27/00* (2006.01)

(52) U.S. Cl.
CPC .................. *A01K 27/003* (2013.01)

(58) Field of Classification Search
CPC .............................. A01K 27/003; A01K 27/00
USPC .......................................................... 119/795
See application file for complete search history.

(56) References Cited

U.S. PATENT DOCUMENTS

| | | | | |
|---|---|---|---|---|
| 1,924,596 A * | 8/1933 | Davis | .................. | A01K 27/001 119/798 |
| 2,289,802 A * | 7/1942 | Norton | ................. | A01K 27/001 119/793 |
| 3,096,741 A * | 7/1963 | Ollstein | ............... | A01K 27/003 119/792 |
| 3,441,005 A * | 4/1969 | Fink | ..................... | A01K 27/005 119/798 |
| 3,603,295 A * | 9/1971 | Shuman | ............... | A01K 27/001 119/795 |
| 3,644,966 A * | 2/1972 | Higgins | ................ | F16G 11/101 24/134 P |
| 3,752,127 A * | 8/1973 | Baker | .................. | A01K 27/003 119/797 |
| 3,937,418 A * | 2/1976 | Critelli | ................. | A01K 27/004 242/384.7 |
| 3,941,354 A * | 3/1976 | Paige | ...................... | B66D 3/24 194/204 |
| 4,019,463 A * | 4/1977 | Kitchen | ............... | A01K 27/003 119/793 |
| 4,391,226 A * | 7/1983 | Guthrie | ................ | A01K 27/005 119/797 |
| 4,493,134 A * | 1/1985 | Karr | ........................ | F16G 11/14 174/92 |

(Continued)

OTHER PUBLICATIONS

Strapworks, Explore the Various Types of Cord Locks Available from Strapworks.com with Brooklyn John, Aug. 16, 2013, YouTube, Video, https://www.youtube.com/watch?v=oLLWj3MNAIs&list=UUhBde81IqZb00r4dl1V8J6g (Year: 2013).*

(Continued)

*Primary Examiner* — Brady W Frazier
*Assistant Examiner* — Jodutt Basrawi
(74) *Attorney, Agent, or Firm* — The Concept Law Group, PA; Scott M. Garrett; Scott D. Smiley

(57) ABSTRACT

A pet leash includes a loop handle that is configured to fit loosely over a user's wrist or to be held in the user's hand. A sliding cinch member is disposed on the loop handle and is configured to allow a user to adjust the size of the loop between the sliding cinch member and the end of the loop handle, allowing a user to place their hand through the loop and slide the sliding cinch member to make the portion of the loop handle over the user's wrist fit snugly.

17 Claims, 9 Drawing Sheets

(56) References Cited

U.S. PATENT DOCUMENTS

| | | | | |
|---|---|---|---|---|
| 4,537,155 A * | 8/1985 | Buratovich | A01K 27/003 | 119/797 |
| 4,562,792 A * | 1/1986 | Pak | A01K 27/003 | 119/797 |
| 4,745,883 A * | 5/1988 | Baggetta | A47D 13/086 | 119/770 |
| 4,974,549 A * | 12/1990 | Gordon | A01K 27/00 | 119/793 |
| 5,099,799 A * | 3/1992 | Giacobbe | A01K 1/04 | 119/793 |
| 5,146,876 A * | 9/1992 | McPhail | A01K 27/005 | 119/798 |
| 5,317,989 A * | 6/1994 | Swanson | A01K 27/003 | 119/792 |
| D354,760 S * | 1/1995 | Wolff | F16G 11/101 | D16/339 |
| 5,485,811 A * | 1/1996 | Jacobsen | A01K 27/003 | 119/792 |
| 5,503,113 A * | 4/1996 | Knight | A01K 27/002 | 119/856 |
| 5,732,662 A * | 3/1998 | Jacobsen | A01K 27/003 | 119/798 |
| 5,732,663 A * | 3/1998 | Manzella | A01K 27/005 | 119/798 |
| 5,740,764 A * | 4/1998 | Jacobsen | A01K 27/003 | 119/792 |
| 5,791,295 A * | 8/1998 | Schmid | A01K 27/003 | 119/793 |
| 5,806,731 A * | 9/1998 | Mark | F41C 33/0236 | 2/300 |
| 5,873,328 A * | 2/1999 | Campbell | A01K 27/005 | 119/795 |
| 5,915,336 A * | 6/1999 | Watson | A01K 27/005 | 119/797 |
| 5,947,062 A * | 9/1999 | Hoffman | A01K 27/003 | 119/769 |
| 6,017,174 A * | 1/2000 | Ross | B60P 7/0876 | 410/100 |
| 6,053,129 A * | 4/2000 | Akre | A01K 27/005 | 119/795 |
| 6,081,925 A * | 7/2000 | Reiber | A41F 19/005 | 2/125 |
| 6,125,616 A * | 10/2000 | Brown | B68C 1/12 | 54/66 |
| 6,223,694 B1 * | 5/2001 | Rubin | A01K 27/003 | 119/795 |
| 6,619,238 B1 * | 9/2003 | Amato | A01K 27/003 | 119/792 |
| 6,712,026 B1 * | 3/2004 | Carville, Jr. | A01K 27/004 | 119/794 |
| 6,827,045 B1 * | 12/2004 | Willner | A01K 27/003 | 119/795 |
| 7,980,201 B2 * | 7/2011 | Muelken | A01K 27/001 | 119/792 |
| 9,374,984 B2 * | 6/2016 | McCay | A01K 27/003 | |
| 9,480,240 B2 * | 11/2016 | Sinko | A01K 25/00 | |
| 9,770,012 B2 * | 9/2017 | Chappell | A01K 27/003 | |
| 9,861,077 B2 * | 1/2018 | Aked-Hurditch | A01K 27/005 | |
| 2002/0023595 A1 * | 2/2002 | Kaufman | A01K 27/003 | 119/797 |
| 2003/0145928 A1 * | 8/2003 | Smith | A63B 55/406 | 150/159 |
| 2004/0112302 A1 * | 6/2004 | Guynn | A47D 13/086 | 119/770 |
| 2005/0211188 A1 * | 9/2005 | Grilliot | A62B 35/0006 | 119/770 |
| 2006/0027189 A1 * | 2/2006 | Luber | A01K 27/003 | 119/795 |
| 2006/0042562 A1 * | 3/2006 | Wagner | A01K 27/003 | 119/792 |
| 2007/0006821 A1 * | 1/2007 | Mitnick | A01K 27/003 | 119/795 |
| 2009/0071417 A1 * | 3/2009 | Simmensen | A01K 27/001 | 119/793 |
| 2009/0145372 A1 * | 6/2009 | Fithian | A01K 27/003 | 119/795 |
| 2009/0229537 A1 * | 9/2009 | Muelken | A01K 27/004 | 119/792 |
| 2012/0137988 A1 * | 6/2012 | Kali | A01K 27/003 | 119/795 |
| 2013/0133591 A1 * | 5/2013 | Silva | A01K 27/003 | 119/793 |
| 2015/0237831 A1 * | 8/2015 | Beck | A01K 27/003 | 119/795 |
| 2015/0250144 A1 * | 9/2015 | Lin | A01K 27/001 | 119/792 |
| 2015/0351524 A1 * | 12/2015 | Martinez | A45F 5/02 | 24/3.9 |
| 2016/0007572 A1 * | 1/2016 | Aked-Hurditch | A01K 27/003 | 119/707 |
| 2016/0165849 A1 * | 6/2016 | Lewis | A01K 27/003 | 119/770 |
| 2016/0208835 A1 * | 7/2016 | Derr | A45F 5/00 | |
| 2017/0049078 A1 * | 2/2017 | Farrar | A01K 27/003 | |
| 2017/0295754 A1 * | 10/2017 | Hiers | A01K 27/001 | |
| 2017/0367303 A1 * | 12/2017 | Bitar | A01K 27/005 | |
| 2018/0168129 A1 * | 6/2018 | Dunbar | A01K 27/001 | |
| 2018/0199547 A1 * | 7/2018 | Moore | A01K 27/005 | |
| 2018/0332826 A1 * | 11/2018 | Aiton | A01K 27/003 | |

OTHER PUBLICATIONS

ValueBeltsPlus, Vachetta Leather Shoulder Pads for Bag Purse & Carryalls, Jan. 18, 2019, Webpage, https://web.archive.org/web/20190118213541/https://valuebeltsplus.com/products/copy-of-leather-shoulder-pads-for-hand-bag-briefcases-and-purse-straps-4-colors (Year: 2019).*

* cited by examiner

PET LEASH HAVING A LOOP HANDLE AND SLIDING CINCH MEMBER TO ADJUST LOOP SIZE OF LOOP HANDLE

FIELD OF THE INVENTION

The present invention relates generally to pet leashes, and, more particularly, relates to a pet leash having a loop handle that is size-adjustable.

BACKGROUND OF THE INVENTION

There are a wide variety of pet leash designs available in the market, from very simple self-cinching leads to elaborate hands-free harness arrangements. The more complex leash designs address problems such as efficient ways of coupling to an animal harness or securing the leash to a person's body to allow free use of both hands while still securing the animal. These are useful designs but they do not address all of the problems people experience with leashes.

It is common for a leash to have a handle, typically in the form of a loop at the end of the leash opposite the end that connects to the animal's collar or harness, or which otherwise restrains the animal. On many leashes the loop is fixed and not adjustable. Some leashes include a buckle over the loop material, which is typically flat webbed fabric, that allows a user to adjust the size of the loop.

A loop handle can be held by a user in their hand, or alternatively, the user can pass their hand through the loop and hold the lead or lower portion of the loop in the their hand, or let the loop rest over their wrist without holding the leash elsewhere. For a non-adjustable loop, when the user wears the loop over their wrist, with their arm passing through the loop, to be able to use their hand with the loop over their wrist, the loop can fall off easily. For the adjustable handles, a user can adjust the loop to fit snugly but this can result in a couple different problems. For one, if the loop is small enough to fit snugly over the user's wrist, the user is likely to have a difficult time getting their hand through the loop as a person's hand is typically larger than their wrist. Secondly, once snugly on a person's wrist, if the animal is large and suddenly moves away from the user, then the user can be pulled off balance and fall, be dragged or suffer injury to their wrist.

Therefore, a need exists to overcome the problems with the prior art as discussed above.

SUMMARY OF THE INVENTION

In accordance with some embodiments of the inventive disclosure, there is provided a pet leash that includes a handle portion comprised of a fabric tube having a total handle length. The handle portion can have an elastic member disposed inside the fabric tube of the handle portions, and the elastic member can have a rest length that is shorter than the total handle length. The fabric tube has an end that is attached to the pet leash to form a loop having a first side, a second side, and a distal end. The pet leash can further include a sliding cinch member having a cinch passage. The sliding cinch member can be disposed over the loop such that the first side and the second side of the loop pass through the cinch passage. The sliding cinch member can have a first extension on a first side of the cinch passage and a second extension on a second side of the cinch passage opposite the first side of the cinch passage. The cinch passage is configured to frictionally engage the first and second sides of the loop and to slide along the first and second sides of the loop when pushed such that the sliding cinch member does not move along the first and second sides of the loop unless pushed.

In accordance with another feature, the sliding cinch member is formed of a rigid material.

In accordance with another feature, the sliding cinch member is formed of a rigid material.

In accordance with another feature, the sliding cinch member is formed of two flat body portions arranged back to back that are attached together at left and right sides of a middle section, and are not attached together in the middle section in order to form the cinch passage.

In accordance with another feature, the two flat body portions of the sliding cinch member are attached together with rivets, having a rivet on a left side of the middle section and a rivet on a right side of the middle section.

In accordance with another feature, the two flat body portions of the sliding cinch member each have a left side extension and a right side extension and wherein the left side extensions are sewn or glued together, and the right side extensions are sewn or glued together.

In accordance with another feature, the two flat body portions each have a felt backing that is exposed in the cinch passage.

In accordance with another feature, the rivets on the left and right sides are positioned below a centerline, from bottom to top, on the sliding cinch member.

In accordance with some embodiment of the inventive disclosure, there is provided a pet leash assembly having an adjustable loop handle that includes a handle portion forming a loop. The pet leash assembly can further include a sliding cinch member having a cinch passage through the sliding cinch member. The sliding cinch member can be disposed over the loop such that a first side and a second side of the loop pass through the cinch passage. The sliding cinch member can be configured to frictionally engage the first and second sides of the loop and being further configured to slide along the first and second sides of the loop when in frictional engagement with the loop.

In accordance with another feature, the loop comprises an elastic member configured to stretch to allow the loop to be lengthened, and wherein the loop is comprised of a material that hold the elastic member, wherein the material has a length that is longer than an unstretched length of the elastic member, thereby limiting a distance which the elastic member can be stretched.

In accordance with another feature, the sliding cinch member is formed of a rigid material.

In accordance with another feature, the sliding cinch member is formed of two flat body portions arranged back to back that are attached together at left and right sides of a middle section, and the two flat body portions are not attached together in the middle section in order to form the cinch passage between the two flat body portions in the middle section.

In accordance with another feature, wherein the two flat body portions of the sliding cinch member are attached together with rivets, having a rivet on a left side of the middle section and a rivet on a right side of the middle section.

In accordance with another feature, the two flat body portions of the sliding cinch member each have a left side extension and a right side extension and wherein the left side extensions are sewn or glued together, and the right side extensions are sewn or glued together.

In accordance with another feature, the two flat body portions each have a felt backing that is exposed in the cinch passage.

In accordance with another feature, the rivets on the left and right sides are positioned below a centerline, from bottom to top, on the sliding cinch member.

In accordance with another feature, the sliding cinch member includes a clamp member having an engaging portion biased into the cinch passage by a spring, and moveable by an actuator portion.

In accordance with some embodiments of the inventive disclosure, there is provided a pet leash assembly that includes a leash having a leash body and a loop handle at an end of the leash body. The leash body and loop handle can be formed of a flattened fabric tube having a leash width. The pet leash assembly further includes a sliding cinch member having a cinch passage through the sliding cinch member. The sliding cinch member can be disposed over the loop handle such that the loop handle passes through the cinch passage. The cinch passage is sized to frictionally engage the loop handle and is configured to slide along the loop handle to adjust a size of a loop portion of the loop handle and it has a cinch passage width that is less than the leash width. The loop handle includes an elastic member disposed inside the loop handle and having an unstretched length that is less than a total length of the loop handle.

In accordance with another feature, the sliding cinch member comprises two flat body portions formed of a flexible material, each of the two flat body portions having an outer surface and an inner surface, wherein the two flat body portions are arranged such that the inner surfaces of the two flat body portions are facing each other, wherein the two flat body portions define a middle section and are joined together at a left side to the left of the middle section and at a right side to the right of the middle section, and wherein the two flat body portions are not joined together in the middle section thereby forming the cinch passage in the middle section between the two flat body portions.

In accordance with another feature, the two flat body portions at attached together by a first rivet on the left side of the middle section and a second rivet on the right side of the middle section.

In accordance with another feature, the inner surfaces of the two flat body portions comprise a fibrous material.

Although the invention is illustrated and described herein as embodied in a pet leash assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the leash. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
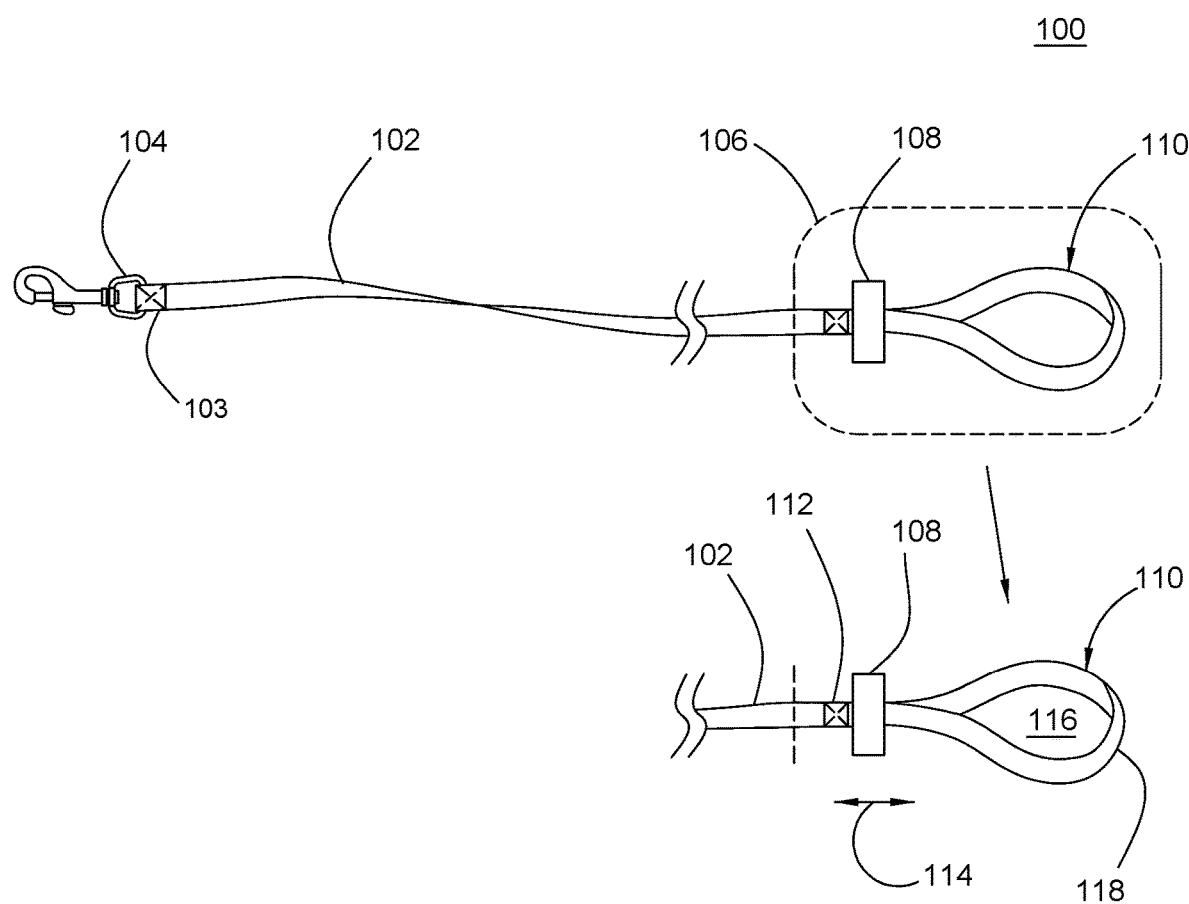
FIG. 1 is view of a leash having a sliding cinch member on a handle of the leash, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel pet leash assembly that allows the user to adjust a size of the loop handle of the pet leash by adjusting a sliding cinch member disposed on the loop handle. This allows, for example, the user to adjust the loop handle size around their wrist so that, without an undue tension on the leash, the loop handle will remain on the user's wrist such that the user does not have to grasp the leash or loop handle. The user can also move the sliding cinch member to increase the size of the loop around the user's wrist and thereby allow the user to remove the loop handle from the user's wrist.

FIG. 1 is view of a leash 100 having a sliding cinch member 108 on a handle 110 of the leash 100, in accordance with some embodiments. The leash 100 includes a body 102 which is a length of a strap, rope, cord, flat tube, or other similar structures and materials. At a first end 103 of the body 102 is an attachment feature 104 configured to attach to a collar or harness, or which is otherwise configured to attach to an animal or pet to allow a user of the leash 100 to restrain or lead the animal. At a second end 106 there is formed a loop handle 110 which is conventionally formed by a free end of the body 102 being attached to a point on the body 102 closer to the first end 103. Typically the free end is stitched to the body 102 to form the loop handle 110. The loop handle 110 effectively has two portions that are contiguous to form a loop. The loop is large enough, circumferentially, to allow a user to easily place a hand through the loop.

A sliding cinch member 108 is disposed over both portions of the loop, and can be slid along the loop, as indicated by arrow 114. The sliding cinch member 108 comprises a cinch passage through the sliding cinch member 108 which the two portions of the loop pass through. The cinch passage is sized such that the sliding cinch member frictionally engages the material of the loop sides with enough resistance to generally stay in place unless pushed or otherwise moved by a user. An optimum size of the cinch passage will be based on the size of the loop sides (e.g. how much cross sectional area they occupy), and can be determined by experiment, but in general the sliding cinch member 108 should hold in place unless some moderate force is exerted on it to slide it along the loop in either direction.

To use the leash 100, a user can place their hand through the loop of the loop handle 110, in space 116, so that the loop is loosely around the user's wrist. Then sliding cinch member 108 can be slid by the user toward the user's arm, reducing the size of the loop between the sliding cinch member 108 and the end 118 of the loop. The sliding cinch member 108 can be adjust until the size of the loop is small enough that it will not easily fit over the user's hand, thereby retaining the leash on the user's wrist, allowing the user to remain in control of the leash while having free use of the user's hand, and also allowing the user to grasp the leash body 102 or lower portions of the loop 112 such that the sliding cinch member 108 will be positioned on the loop between the user's wrist and hand. When the user is done using the leash, the user can slide the sliding cinch member 108 farther down the loop, away from the loop end 118, to enlarge the loop to allow the user to remove their hand through the loop. The sliding cinch member 108 can be made of a variety of materials, including leather, plastic, and rubber. The material can be flexible, and can even stretch in some embodiments. Preferably the sliding cinch member 108 is durable to resist wear from being slid back and forth along the loop handle. Furthermore, the sliding cinch member can be of any practical size and shape sufficient to provide a user with a grip or other features to push/pull the sliding cinch member along the loop handle against the friction between the sliding cinch member in the cinch passage and the material of the loop handle.

Figure 2:
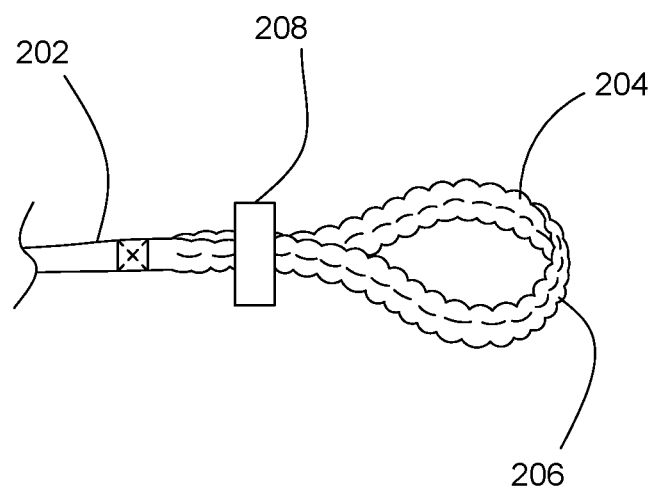
FIG. 2 is a view of a handle end of a leash having a shock absorbing handle and a sliding cinch member, in accordance with some embodiments.

FIG. 2 is a view of a handle end of a leash 200 having a shock absorbing handle and a sliding cinch member, in accordance with some embodiments. In some embodiments, the leash 200 can form a loop handle 204 from a body 202 that is a flat tubular fabric material or webbing. An elastic member 206 having a first length can be placed inside the end of the body, and a length of the body that is longer than the elastic member is then sewn to the body. As a result, the material of the body 202 used to form the loop handle 204 gets "scrunched up" or longitudinally folded along the elastic member 206. The loop handle 204 can be pulled on to increase its size, stretching the elastic member 206, until the loop handle has a length equal to the length of the body used to form the loop handle. This structure creates a shock absorber such that if an animal on the leash 200 suddenly lurches, the loop handle will stretch, resisting the force imparted to the leash by tension.

A sliding cinch member 208 is provided over the loop handle, that, like sliding cinch member 108, can be slid along the loop the adjust the resting size (e.g. not under tension) of the loop of the loop handle. The user can adjust the resting size of the loop handle 204 so that the portion of the elastic member 206 that is around the user's wrist is small enough to encircle the user's wrist but not large enough to fit over the user's hand. However, if the animal attached to the leash suddenly jerks or lurches against the leash, the elastic material 206 will stretch, and the loop size will likewise increase as the body material used to form the loop handle 204 unfolds, to the point that the loop size will be sufficient to fit over the user's hand. Although it may be undesirable to have the animal depart from the user, unrestrained, by allowing the loop handle to come off the user's wrist/hand, a potentially serious injury can be avoided.

Figure 10:
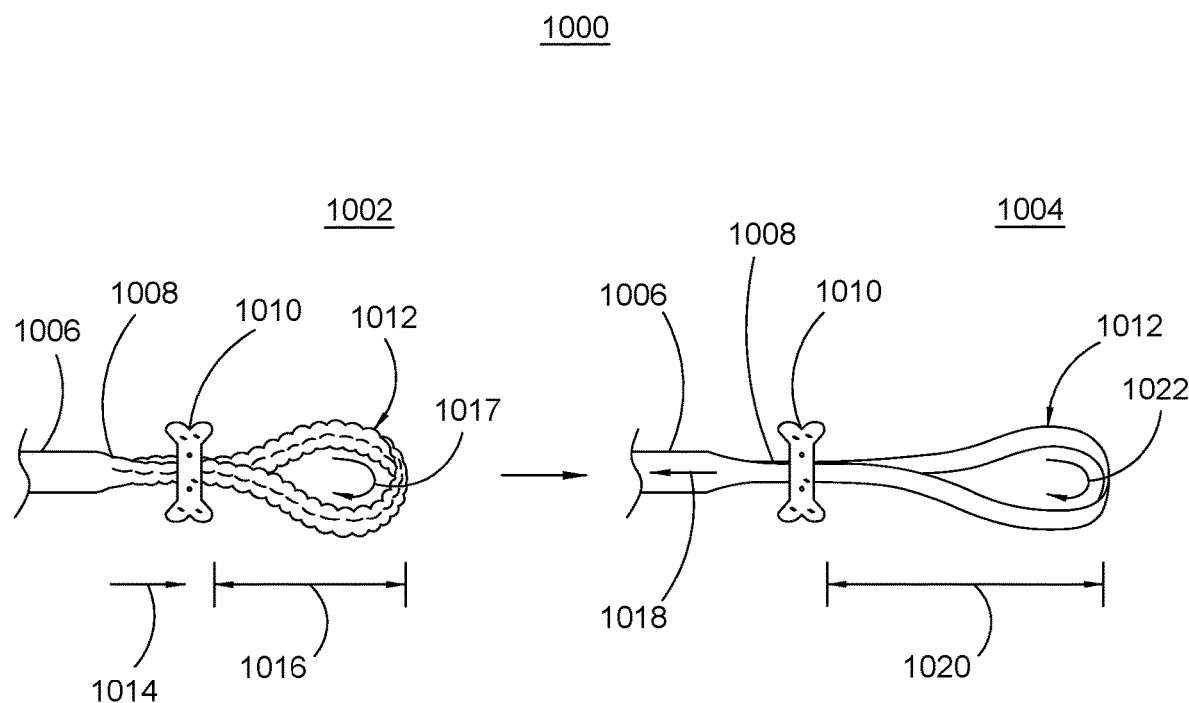
FIG. 10 is a use diagram showing how a leash having an elastic loop handle with a sliding cinch member operates in response to a sudden pull on the leash handle to release a user's hand from the loop handle, in accordance with some embodiments.

FIG. 10 shows an example of an elastic loop handle in use. In a rest state 1002, a leash 1000 includes a leash body 1006 and a loop handle 1012 including an elastic member. A covering, which can be formed from the material of the leash body 1006 can be placed over the elastic material and sewn to the body at a location 1008. A sliding cinch member 1010 can be placed over the loop, and moved in the direction of arrow 1014 to cinch the sliding cinch member 1010 toward the user's wrist after the user has placed their hand through the loop handle 1012. In the rest state 1002, the elastic member is contracted to its resting length, and thus the loop handle has a resting circumferential length 1017 and a total resting length 1016. In tensioned state 1004, however, a tension is exerted on the leash 1000 as indicated by arrow 1018. As a result, the elastic member in the loop handle 1012 stretches, causing the total length to increase to a tensioned length 1020, and the circumferential length of the loop handle 1012 to increase to the tensioned circumferential length 1022, which is larger than the resting circumferential length 1017.

Figure 3:
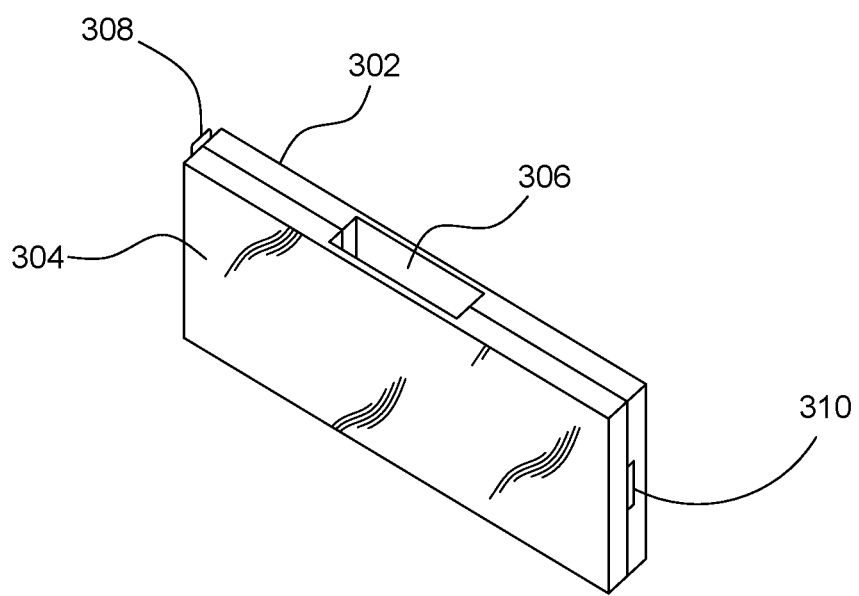
FIG. 3 is a perspective view of a sliding cinch member for a loop handle of a leash, in accordance with some embodiments.

FIG. 3 is a perspective view of a sliding cinch member 300 for a loop handle of a leash, in accordance with some embodiments. The sliding cinch member 300 shown here is a rigid-bodied member that can be made, for example, of plastic or similar materials. The sliding cinch member 300 can include opposing body portions 302, 304 that each have a corresponding vertical cutout or relief that together form a cinch passage 306 through which a loop handle is placed. The opposing body portions 302, 304 can be permanently joined together in some embodiments, and in other embodiments the opposing body portions 302, 304 can be separable, and joined, for example, by a hinge 308 and a clasp 310. The hinge 308 can be disposed on first end of the opposing body portions 302, 304, allowing the opposing body portions to rotate about the hinge with respect to each other. The clasp 310 is located at the opposing end of the body portions 302, 304, and is configured to hold the body portions 302, 304 together until manipulated to allow the body portions 302, 304 to rotate about the hinge 308. The hinge 308 and clasp 310 allow the sliding cinch member 300 to be easily placed on the loop handle of a leash by opening the clasp, and spreading the body portions 302, 304 apart, and placing the loop handle in the channel forming the cinch passage 306 through the sliding cinch member 300. Then the body portions 302, 304 can be closed (moved toward each other) and the clasp 310 closed to hold the body portions 302, 304 together. The material of the loop handle will then be frictionally engaged with the sliding cinch member 300 in the cinch passage, and the sliding cinch member 300 can be slid along the loop handle as shown in FIG. 1, for example, to adjust the size of the loop handle. Portions of the sliding cinch member 300 on each side of the cinch passage form extensions that allow the user to push on the sliding cinch member 300 to move the sliding cinch member 300 along the loop handle, to adjust or change the size of the loop handle.

Figure 4:
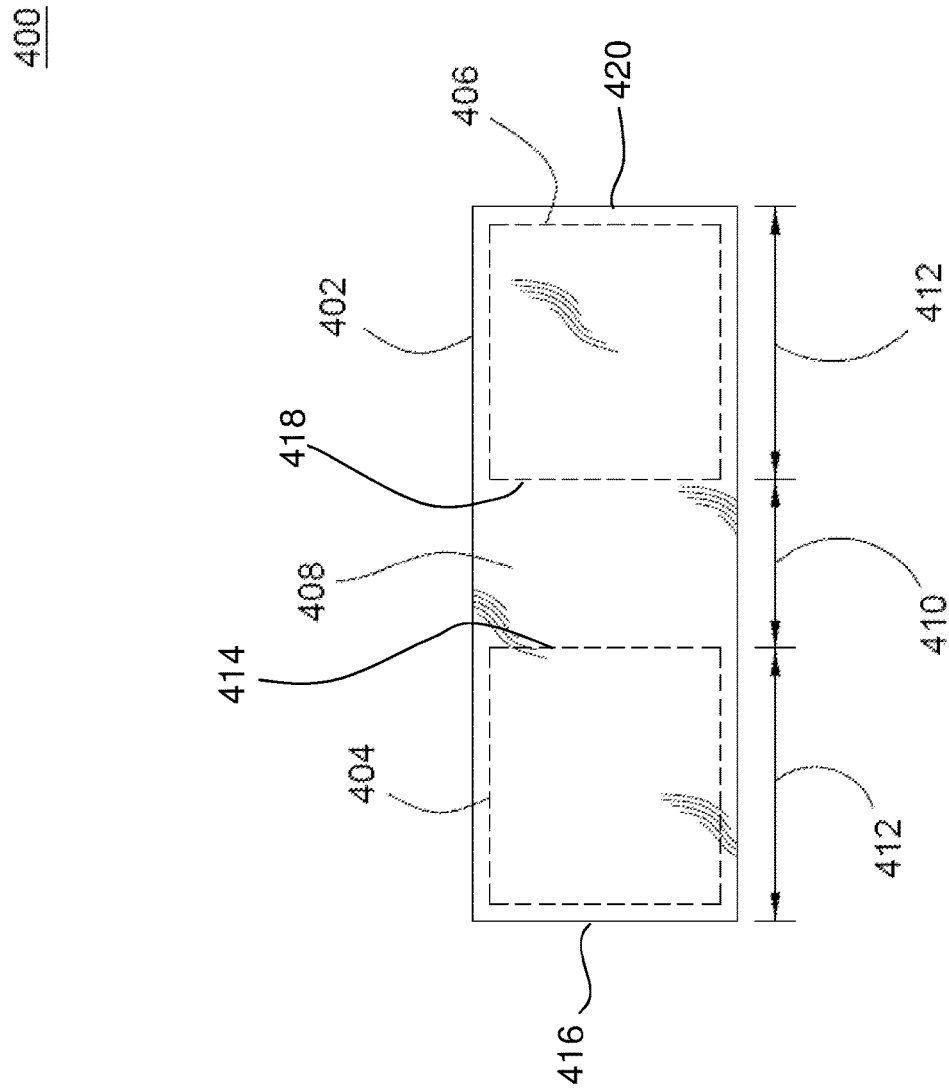
FIG. 4 is a side view of a sliding cinch member for a loop handle of a leash, in accordance with some embodiments.
Figure 5:
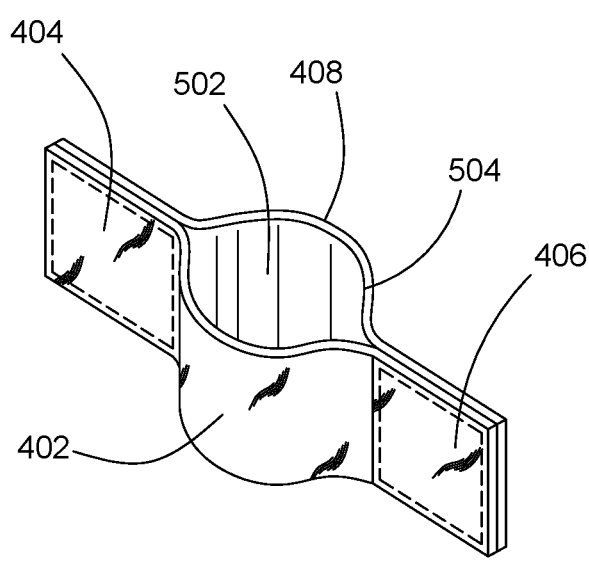
FIG. 5 is a top and side perspective view of a sliding cinch member for a loop handle of a leash, in accordance with some embodiments.

FIG. 4 is a side view of a sliding cinch member 400 for a loop handle of a leash, in accordance with some embodiments. FIG. 5 shows a top and side perspective view of the sliding cinch member 400 in a configuration to receive a loop handle of the leash. The sliding cinch member 400, unlike that of FIG. 3, is formed using non-rigid body members, of which one body member 402 can be seen in this view. Body member 402 and the opposing body member 504 are joined together in a way that allows them to be separated in a middle region 408 to create a cinch passage 502. The opposing body members 402, 504 can be joined at their end regions 404, 406, such as by being sewn or glued together. The middle portion 408 is defined between a first side 414 of the middle portion 408 and a second side 418 of the middle portion. When the opposing body portions 402, 504 are laid flat with a major surface of one facing and against a major surface of the other, the middle portion 408 has a width 410 between the first side 414 and the second side 418 of the middle portion 408. End portions, or extensions 404, 406 extend away from the middle portion 408 by distances 412, which are selected to be wide enough to allow a user to push/pull on the sliding cinch member 400. A first extension 404 extends away from the middle portion 408 from the first side 414 of the middle portion 408 to a first end 416 that is width 412 from the first side 414 of the middle portion 408. Likewise, a second extension 406 extends in the opposite direction from the first extension 404 from the second side 418 of the middle portion 408 to a second end 420 that is a width 412 from the second side 418 of the middle portion. Thus, the first extension 404 and second extension 406 are generally coplanar on opposite sides of the middle portion 408 and formed by corresponding portions of the body members 402, 504 that are arranged back to back and joined together between respective sides 414, 418 of the middle portion and their respective ends 416, 420, with each extension forming a generally flat surface along the width 412 on each side of the middle portion 408. FIG. 5 shows the cinch passage 502 open, which is created by moving end portions 404, 406 toward each other, causing the material of the body portions 402, 504 to move outward in the middle portion 408. Further, it can be seen in FIG. 5 that the first and second extensions 404, 406 are flat, extending in opposite directions from the middle section 408 and the cinch passage 502, and are generally coplanar. The body portions 402, 504 can be made of flexible materials such as, for example, rubber, leather, plastic, and so on.

Figure 6:
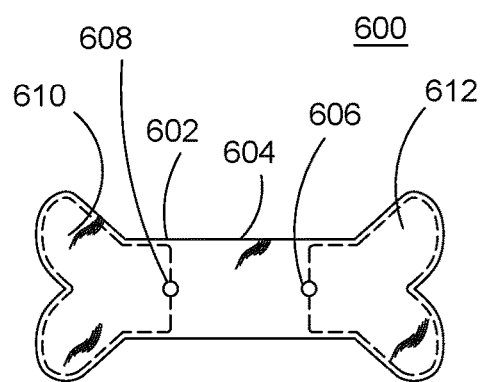
FIG. 6 is a side view of a sliding cinch member for a loop handle of a leash, in accordance with some embodiments.

FIG. 6 is a side view of a sliding cinch member 600 for a loop handle of a leash, in accordance with some embodiments. The sliding cinch member 600 is decoratively shaped like a bone, and has opposing body members as in FIGS. 4-5, with body member 602 in view here. A central or middle section 604 is defined between two rivets 606, 608 which join the body members together, and also define side extension sections 610, 612. Side extension section 610 extends from rivet 608 to the left, and side extension section 612 extends from rivet 606 to the right, and both side extension sections 610, 612 extend away from the middle section 604 in opposite directions from the middle sections 604. The body portions can be further joined together at the side extension sections 610, 612 by being sewn or glued together.

The middle section 604 can be opened to create a cinch passage between the middle sections of the body portions, and a loop handle can be passed through the cinch passage.

Figure 7:
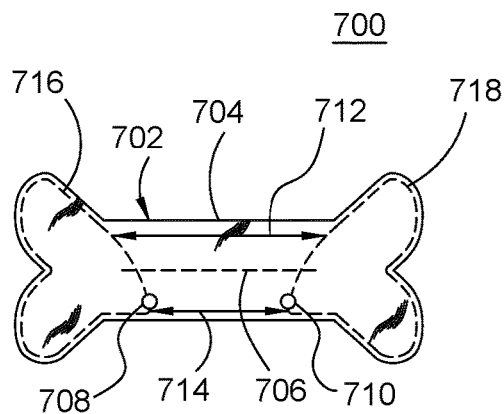
FIG. 7 is a side view of a sliding cinch member for a loop handle of a leash, in accordance with some embodiments.

FIG. 7 is a side view of a sliding cinch member for a loop handle of a leash, in accordance with some embodiments. The sliding cinch member 700 is similar to that of FIG. 6, having body portions such as body portion 702, and a middle section 704 that is defined between rivets 708, 710. However, in FIG. 6, the rivets 608, 610 were disposed in the center of the sliding cinch member, from top to bottom. In sliding cinch member 700, the rivets 708, 710 are placed below the center (e.g. centerline 706, which is halfway between the top and bottom of the middle section 704 on the page as shown). As a result of moving the rivets toward the bottom side of the sliding cinch member 700 the top of the middle section 704 can open wider than the bottom of the middle section, as indicated by arrows 712, 714, respectively. The end sections 716, 718 of the body portions can be joined together such as by being sewn or glued together in such a way as to facilitate the middle section being able to open wider at the top than at the bottom. By allowing one side of the middle section 704 to open wider, it allows the sliding cinch member 700 to be more easily moved along the loop handle in one direction by reducing mechanical interference between the material of the sliding cinch member 700 and the material of the loop handle.

Figure 8:
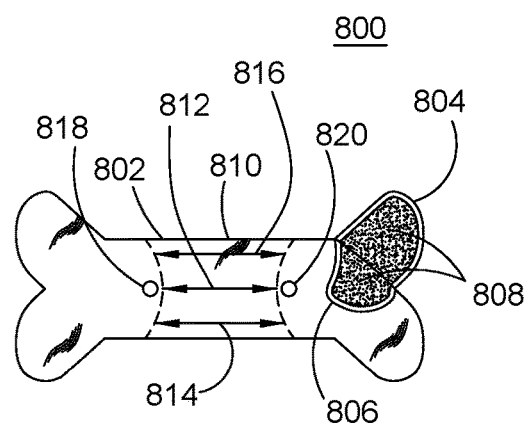
FIG. 8 is a side view of a sliding cinch member for a loop handle of a leash, showing the lining of the body sides of the sliding cinch member, in accordance with some embodiments.

FIG. 8 is a side view of a sliding cinch member 800 for a loop handle of a leash, showing the lining of the body portions of the sliding cinch member 800, in accordance with some embodiments. The sliding cinch member 800 two body portions such as body portion 802 that are generally flat members arranged alongside each other in a parallel arrangement. The two body portions are coupled together by a pair of rivets 818, 820 or similar fasteners, which are spaced apart by a distance 812, defining a middle section 810 of the sliding cinch member that is generally centered from right to left as shown here. The distance 812 between the rivets can be selected, when the sliding cinch member is flattened substantially as shown, and the two body portions are together in the middle section 810, to be less than the width of the leash strap. In some embodiments the distance 812 can be between 50% to 80% the width of the leash strap. The leash strap is the portion of a flat leash that forms the length of the leash and is used to create the loop handle. By selecting the width 812 between the rivets 818, 820 (or equivalent fastenings) to be less than the width of the leash it ensures frictional engagement with the leash.

At the right end of the sliding cinch member 800 end portions 804, 806 have been separated to show the interior lining 808 of the body portions. The interior lining 808 can be a felt-like or similarly fibrous lining. The lining 808 can help glue adhesion between the two body portions, as well as to increase the friction between the lining and the loop handle of the leash. Furthermore, it is also contemplated that the end sections, such as the right section to the right of rivet 820, the left section that is to the left of rivet 818, can have those sections of the body portions glued together in such a way that the top and bottom of the middle section 810, where the body portions are not glued or attached together, are wider than the center, between the rivets 818, 820, as indicated by arrows 814, 816. That is, from the top to the bottom of each side the middle section 810, the joined boundary between the body portions can be arc-shaped. This can allow passage of a loop handle formed with an elastic member inside of a longitudinally gathered exterior (i.e. "scrunched") to feed easier through the sliding cinch member 800, but with the portion directly between the rivets 818, 820 still providing sufficient frictional engagement with the loop handle to hold the sliding cinch member in place on the loop handle.

Figure 9:
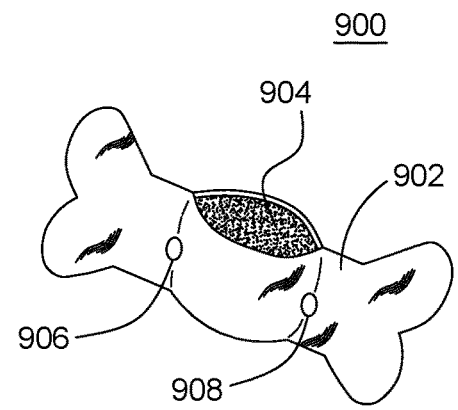
FIG. 9 is a top and side perspective view of a sliding cinch member for a loop handle of a leash, in accordance with some embodiments.

FIG. 9 is a top and side perspective view of a sliding cinch member 900 for a loop handle of a leash, in accordance with some embodiments. The sliding cinch member 900 can be substantially similar to those of FIGS. 6-8 in which two body portions 902, 903, which are generally flat, planar members with substantially similar shapes are arranged back to back and joined together in a way that a middle section allows the body portions to be separated from each other, creating a cinch passage 904 through which the loop handle of a leash can be fed so that the sliding cinch member 900 can be used to adjust the size of the loop of a portion of the loop handle around a user's wrist.

Figure 11:
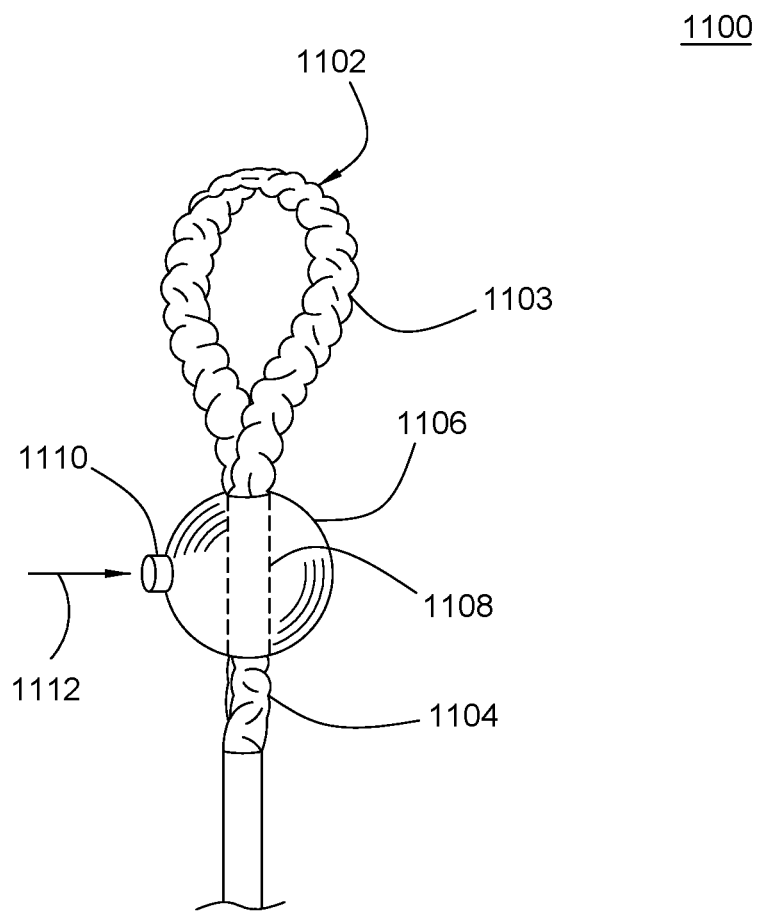
FIG. 11 is a side view of a leash having an elastic loop handle with a sliding cinch member with a release, in accordance with some embodiments.

FIG. 11 is a side view of a leash 1100 having an elastic loop handle 1102 with a sliding cinch member 1106 with a clamp, in accordance with some embodiments. The loop handle 1102 passes through a cinch passage 1108 of the sliding cinch member 1106 such that a free portion 1103 forms a loop, above the sliding cinch member 1106 as shown here, and a cinched portion 1104 is below the sliding cinch member 1106. The clamp includes an actuator 1110 that extends from the sliding cinch member 1106 and which moves in the direction of arrow 1112 (and in the opposite direction). The clamp is biased to bear against the portion of the loop handle 1102 in the cinch passage 1108, but when the actuator 1110 is pressed in the direction of arrow 1112 the clamp releases, reducing the frictional engagement acting on the portion of the loop handle 1102 in the cinch passage 1108.

Figure 12:
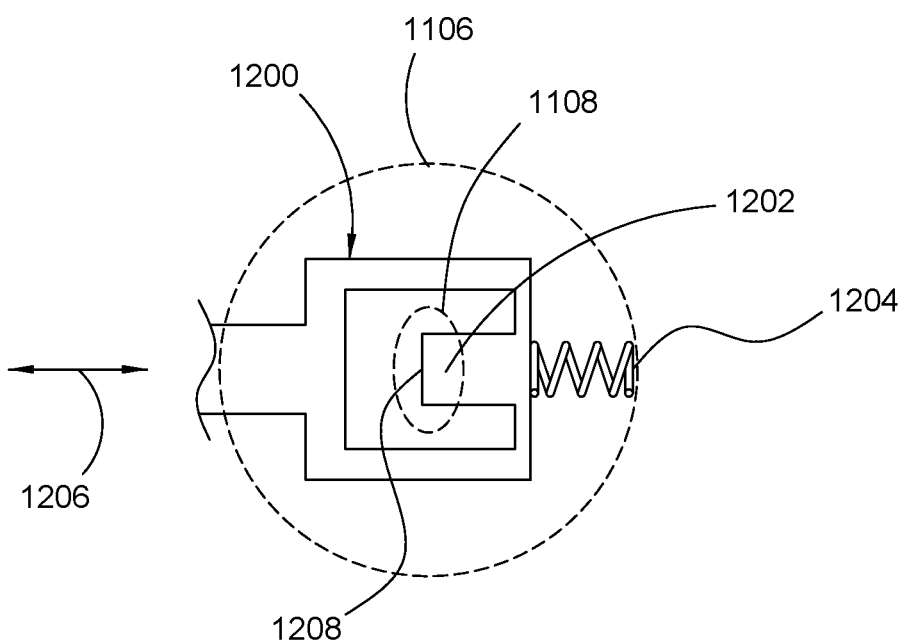
FIG. 12 is a top view of a clamp for a sliding cinch member, in accordance with some embodiments.

FIG. 12 is a top view of a clamp for a sliding cinch member as shown in FIG. 11, in accordance with some embodiments. The clamp is shown from a top view, looking down into the cinch passage, with the material of the sliding cinch member removed. The cinch passage 1108 is represented in dashed line here to show its relative position, and the outer periphery of the body of the sliding cinch member 1106 is also shown in dashed line. However, although shown as a round or spherical member, the sliding cinch member can be formed in any shape that supports the clamp function. The clamp includes a clamp member 1200 including the actuator 1110 and an engaging portion 1202. The clamp member 1200 is biased by a spring 1204. In the position shown, relative to the cinch passage 1108, most of the cinch passage 1108 is closed off. Thus, when the loop handle is passed through the cinch passage 1108, the front face 1208 of the engaging portion 1202 will bear against the loop handle. The clamp member 1200 increases the frictional engagement with the loop handle, and the front face 1208 can include material or features to increase friction (e.g. a rubber cover or rough material). The clamp member 1200 is movable back and forth as indicated by arrow 1206. The spring 1204 biases the clamp member toward the left of the page, and pressing on the actuator 1110 toward the right moves the clamp member 1200 to the right, against the spring 1204, compressing the spring 1204 and reducing the frictional engagement with the loop handle at the front face 1208 of the engaging portion 1202, allowing the user to easily move the sliding cinch member along the loop handle to a desired position before releasing the actuator 1110, whereupon the spring 1204 will push the clamp member 1200 back into full engagement with the loop handle. The clamp member 1200 can be captured in the sliding cinch member 1106 upon assembly of the sliding cinch member 1106.

A leash having loop handle and a sliding cinch member has been disclosed that allows a user to adjust the loop size of a portion of the loop handle. By adjusting the size of the loop, a user can cinch the loop handle around the user's wrist in a way that allows use of the user's hand while still retaining the leash on the user's wrist. At the same time, in embodiments where the loop hand contains an elastic member, the leash can released from the user's wrist if the animal attached to the leash suddenly jerks or pulls on the leash in a way that might otherwise cause injury to the user.

What is claimed is:

1. A pet leash, comprising:
a handle portion comprised of a fabric tube having a total handle length and an elastic member disposed inside the fabric tube having a rest length that is shorter than the total handle length, wherein the fabric tube has an end that forms a loop having a first side, a second side, and a distal end; and
a sliding cinch member formed of a first body portion and a second body portion, each of the first and second body portions being flat and made of a non-rigid material, each of the first and second body portions having a back, the first and second body portions being arranged back to back, the first and second body portions being joined together at a first location and a second location, the first location and second location being on opposing sides of a middle section of the sliding cinch member in which the first and second body portions are not joined, wherein a cinch passage is formed in the middle section between the first and second body portions, the sliding cinch member disposed over the loop such that the first side and the second side of the loop pass through the cinch passage, the sliding cinch member having a first extension on a first side of the cinch passage where the two body portions are joined together and a second extension on a second side of the cinch passage opposite the first side of the cinch passage where the two body portions are joined together, wherein the first body portion and the second body portion in the middle section are moved apart by moving the first and second sides of the cinch passage toward each other, wherein the first extension extends outward from the middle section from the first location, the second extension extends outward from the second location in an opposite direction from the first extension, wherein the first and second extensions are each flat and coplanar with each other, wherein the cinch passage is configured to frictionally engage the first and second sides of the loop and to slide along the first and second sides of the loop when pushed such that the sliding cinch member does not move along the first and second sides of the loop unless pushed.

2. The pet leash of claim 1, wherein the sliding cinch member is formed of leather.

3. The pet leash of claim 1, wherein the first and second body portions are joined at the first and second locations by a first and second rivet, respectively.

4. The pet leash of claim 1, wherein the first and second body portions are sewn or glued together at the first and second flat extension.

5. The pet leash of claim 1, wherein the back of the each of the first and second body portions has a felt backing in the cinch passage.

6. The pet leash of claim 3, wherein the rivets are both positioned on the same side of a centerline through the sliding cinch member that is perpendicular to a direction in which the handle portion passes through the cinch portion.

7. A pet leash assembly having an adjustable loop handle, comprising:
a handle portion forming a loop; and
a sliding cinch member formed of a first body portion and a second body portion, each of the first and second body portions being flat and made of a non-rigid material, each of the first and second body portions having a back, the first and second body portions being arranged back to back, the first and second body portions being joined together at a first location and a second location, the first location and second location being on opposing sides of a middle section of the sliding cinch member in which the first and second body portions are not joined, thereby forming a cinch passage through the middle section of the sliding cinch member between the first and second body portions, the cinch passage having a first curved side and a second curved side opposite the first curved side, the first and second curved sides being curved in a direction along the cinch passage, the sliding cinch member disposed over the loop such that a first side and a second side of the loop pass through the cinch passage, the sliding cinch member being configured to frictionally engage the first and second sides of the loop and being further configured to slide along the first and second sides of the loop when in frictional engagement with the loop;
wherein the first and second body portions form a first flat extension extending away from the middle section at the first location where the first and second body portions are joined together, and wherein the first and second body portions form a second flat extension extending away from the middle section at the second location where the first and second body portions are joined together and in an opposite direction from the first flat extension, and wherein the first flat extension and the second flat extension are coplanar.

8. The pet leash assembly of claim 7, wherein the loop comprises an elastic member configured to stretch to allow the loop to be lengthened, and wherein the loop is comprised of a material that hold the elastic member, wherein the material has a length that is longer than an unstretched length of the elastic member, thereby limiting a distance which the elastic member can be stretched.

9. The pet leash assembly of claim 7, wherein the first and second body portions are made of leather.

10. The pet leash assembly of claim 7, wherein the first and second body portions are joined at the first and second locations by a first and second rivet, respectively.

11. The pet leash assembly of claim 7, wherein the first and second body members are sewn or glued together at the first and second flat extensions.

12. The pet leash assembly of claim 7, wherein the back of the each of the first and second body portions has a felt backing in the cinch passage.

13. The pet leash assembly of claim 10, wherein the rivets are both positioned on the same side of a centerline through the sliding cinch member that is perpendicular to a direction in which the handle portion passes through the cinch portion.

14. A pet leash assembly, comprising:
a leash having a leash body and a loop handle at an end of the leash body, the leash body and loop handle formed of a flattened fabric tube having a leash width;
a sliding cinch member formed of a first body portion and a second body portion, each of the first and second body portions being flat and made of a non-rigid material, each of the first and second body portions having a back, the first and second body portions being arranged back to back, the first and second body portions being joined together at a first location and a second location, the first location and second location being on opposing sides of a middle section of the sliding cinch member in which the first and second body member are not joined, thereby forming a cinch passage through middle section of the sliding cinch member from a top edge of the sliding cinch member to a bottom edge of the sliding cinch member, and wherein the first and second locations where the first and second body portions are joined together are both proximate to one of the top or bottom edges such that a middle section of the cinch passage is operable to open wider than the one of the top or bottom edges where the first and second body portions are joined together, and wherein the cinch passage at an opposite one of the top or bottom edges where the first and second body portions are joined together is operable to open wider than the middle section of the cinch passage, the sliding cinch member being disposed over the loop handle such that the loop handle passes through the cinch passage, the cinch passage being sized to frictionally engage the loop handle and configured to slide along the loop handle to adjust a size of a loop portion of the loop handle and having a cinch passage width that is less than the leash width;

wherein the sliding cinch member has a first extension that extends outward from the middle section from the first location, the sliding cinch member further has a second extension that extends outward from the second location in an opposite direction from the first extension, wherein the first and second extensions are each flat and coplanar with each other; and the loop handle including an elastic member disposed inside the loop handle and having an unstretched length that is less than a total length of the loop handle.

15. The pet leash assembly of claim 14, wherein the first and second body portions are made of leather.

16. The pet leash assembly of claim 15, wherein the two flat body portions are attached together by a first rivet at the first location and a second rivet at the second location.

17. The pet leash assembly of claim 14, wherein the back of the first and second body portions comprise a fibrous material in the cinch passage.

* * * * *